US010884890B2

(12) United States Patent
Bamdhamravuri et al.

(10) Patent No.: US 10,884,890 B2
(45) Date of Patent: *Jan. 5, 2021

(54) ACCURACY SENSITIVE PERFORMANCE COUNTERS

(71) Applicant: INTERNATIONAL BUSINESS MACHINES CORPORATION, Armonk, NY (US)

(72) Inventors: Ram Sai Manoj Bamdhamravuri, Poughkeepsie, NY (US); Deanna Postles Dunn Berger, Hyde Park, NY (US); Mark R. Hodges, Endicott, NY (US); Kenneth D. Klapproth, Austin, TX (US); Guy G. Tracy, Austin, TX (US); Craig R. Walters, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,612

(22) Filed: Aug. 6, 2019

(65) Prior Publication Data

US 2019/0361783 A1   Nov. 28, 2019

Related U.S. Application Data

(63) Continuation of application No. 15/601,272, filed on May 22, 2017, now Pat. No. 10,540,251.

(51) Int. Cl.
G06F 11/34 (2006.01)
G06F 13/16 (2006.01)
(Continued)

(52) U.S. Cl.
CPC ........ G06F 11/3419 (2013.01); G06F 9/3004 (2013.01); G06F 11/3037 (2013.01);
(Continued)

(58) Field of Classification Search
CPC ............. G06F 11/3037; G06F 11/3409; G06F 11/3419; G06F 11/3466; G06F 13/1689; G06F 9/3004
(Continued)

(56) References Cited

U.S. PATENT DOCUMENTS 4,916,556 A * 4/1990 Sander .................. G06F 3/0601
                                                              360/45
6,360,337 B1   3/2002 Zak et al.
(Continued)

FOREIGN PATENT DOCUMENTS

CN           102750219 B       5/2015

OTHER PUBLICATIONS

Donganra, et al., "Using PAPI for hardware performance monitoring on Linux systems," http://www.inuxclustersinstitute.org/conferences/archive/2001/PDF/smoore_Utk.pdf, Published Apr. 15, 2001, pp. 1-11.
(Continued)

*Primary Examiner* — John H Le
(74) *Attorney, Agent, or Firm* — Cantor Colburn LLP; William Kinnaman

(57) ABSTRACT

Methods, systems and computer program products for measuring hardware performance are provided. Aspects include receiving an indication of a start to a hardware operation. A number of clock cycles are counted from the start of a hardware operation to the completion of the hardware operation. A first region comprising a first set of bit location is defined. A second and third region is defined each including a set of bit locations. Based on the first set of bit locations being equal to zero, a granularity flag is set to zero in the sample buffer and the second and third set of bit locations are written to the sample buffer. And based on the first set of bit locations being greater than zero, the granularity flag in
(Continued)

the sample buffer is set to one and the first and second set of bit locations are written to the sample buffer.

20 Claims, 5 Drawing Sheets

(51) Int. Cl.
    *G06F 11/30*     (2006.01)
    *G06F 9/30*     (2018.01)

(52) U.S. Cl.
    CPC ...... *G06F 11/3409* (2013.01); *G06F 11/3466* (2013.01); *G06F 13/1689* (2013.01)

(58) Field of Classification Search
    USPC ............. 702/182, 186; 712/11, 12; 713/502; 714/47.1
    See application file for complete search history.

(56) References Cited

U.S. PATENT DOCUMENTS

| | | |
|---|---|---|
| 7,421,592 B1 | 9/2008 | Kadatch et al. |
| 7,430,696 B2 | 9/2008 | Adkisson et al. |
| 7,895,421 B2 | 2/2011 | Quach et al. |
| 10,540,251 B2 * | 1/2020 | Bamdhamravuri ......................... G06F 11/3037 |
| 2005/0177344 A1 | 8/2005 | Khaleel |
| 2008/0177756 A1 | 7/2008 | Kosche et al. |
| 2014/0298074 A1 | 10/2014 | Murrell et al. |
| 2017/0344668 A1 | 11/2017 | Darbari et al. |
| 2018/0336116 A1 | 11/2018 | Bamdhamravuri et al. |

OTHER PUBLICATIONS

List of IBM Patents or Patent Applications Treated as Related; (Appendix P), Filed Aug. 6, 2019; 2 pages.

* cited by examiner

ACCURACY SENSITIVE PERFORMANCE COUNTERS

DOMESTIC PRIORITY

This application is a continuation of U.S. Non-Provisional application Ser. No. 15/601,272, filed May 22, 2017, the contents of which are incorporated herein by reference in its entirety.

BACKGROUND

The present disclosure relates generally to performance counters, and more specifically, to accuracy sensitive performance counters.

Hardware counters, in computers, are registers built into microprocessors to store the counts of hardware-related activities within a computing system. Counters are sometimes used to conduct low-level performance analysis or tuning of the computer system.

In hardware performance analysis, retaining wide ranges of cycle accurate information is expensive for hardware to implement in terms of chip area and power. Proper sizing of these counters is problematic as chained sequences of events can produce unexpected overflow conditions which can be difficult to plan and predict in all situations. These overflow events result in the loss of data that can prevent analysis and understanding of underlying issues. Typically, this results in over-engineered solutions for contingency at the cost of more area and power, and at the same time, less information being collected as trade-offs are made between which information is most useful to collect given a limited number counters to contain said information.

SUMMARY

In accordance with an embodiment of the invention, a computer-implemented method for measuring hardware performance is described. The method includes receiving an indication of a start to a hardware operation. A number of clock cycles occurring from the start of the hardware operation to a completion of the hardware operation are counted in the pre-counter, wherein the pre-counter is a register and the number of clock cycles is stored in the pre-counter in a binary format. A first region including a first set of bit locations is defined in the pre-counter. Also defined is a second region including a second set of bit locations and a third region comprising a third set of bit locations. Based on the first set of bit locations being equal to zero, a granularity flag is set to zero in the sample buffer and the second and third set of bit locations are written to the sample buffer. And based on the first set of bit locations being greater than zero, the granularity flag in the sample buffer is set to one and the first and second set of bit locations are written to the sample buffer.

In accordance with an embodiment of the invention, a computer-implemented method for measuring hardware performance is described. The method includes receiving an indication of a start to a hardware operation. A number of clock cycles occurring from the start of the hardware operation to a completion of the hardware operation are counted in the pre-counter, wherein the pre-counter is a register and the number of clock cycles is stored in the pre-counter in a binary format. A first region including a first set of bit locations is defined in the pre-counter. Also defined is a second region including a second set of bit locations and a third region comprising a third set of bit locations. Based on a first binary value in the first set of bit locations being equal to zero, writing the second set of bit locations and the third set of bit locations to a first accumulator. And based on the first binary in the first set of bit locations being greater than zero, writing the first set of bit locations and the second set of bit locations to a second accumulator.

In accordance with an embodiment of the invention, a system for measuring hardware performance is described. The system includes a processor, a pre-counter, a multiplexer, and a sample buffer, the processor configured to perform a method. The method includes receiving an indication of a start to a hardware operation. A number of clock cycles occurring from the start of the hardware operation to a completion of the hardware operation are counted in the pre-counter, wherein the pre-counter is a register and the number of clock cycles is stored in the pre-counter in a binary format. A first region including a first set of bit locations is defined in the pre-counter. Also defined is a second region including a second set of bit locations and a third region comprising a third set of bit locations. Based on the first set of bit locations being equal to zero, a granularity flag is set to zero in the sample buffer and the second and third set of bit locations are written to the sample buffer. And based on the first set of bit locations being greater than zero, the granularity flag in the sample buffer is set to one and the first and second set of bit locations are written to the sample buffer.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

Figure 1:
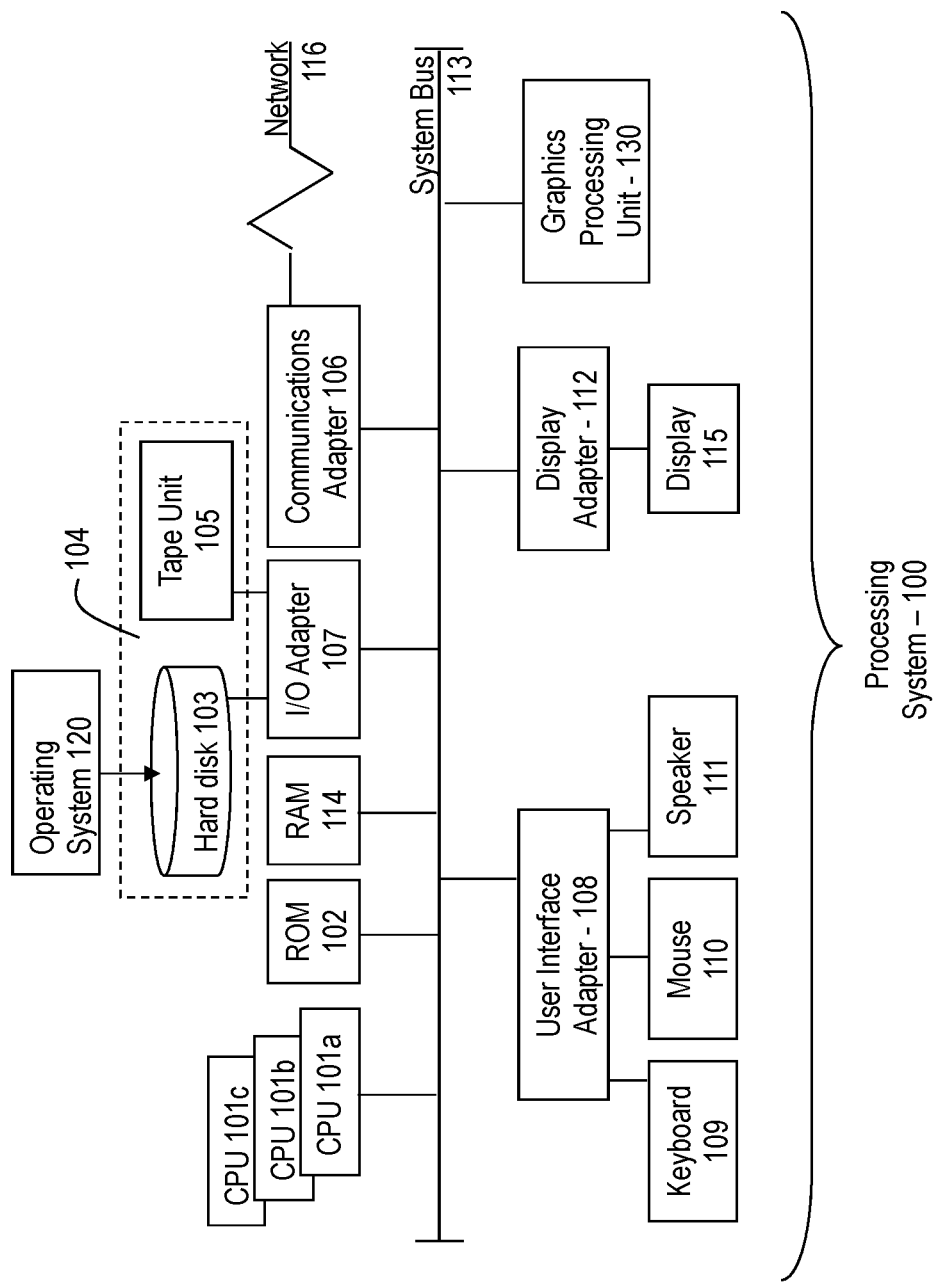
FIG. 1 is a block diagram illustrating one example of a processing system in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1. The system 100 can be implemented in order to perform the testing of various semiconductors and IC devices.

Turning now to an overview of technologies that are more specifically relevant to aspects of the invention, a common problem encountered in hardware performance analysis is that retaining wide ranges of cycle accurate information is expensive for hardware to implement in terms of chip area and power. Proper sizing of these counters is problematic as chained sequences of events can produce unexpected overflow conditions which can be difficult to plan and predict in all situations. These overflow events result in the loss of data that can prevent analysis and understanding of underlying issues. Typically this results in over-engineered solutions for contingency at the cost of more area and power, and at the same time less information being collected as trade-offs are made between which information is most useful to collect given a limited number counters to contain said information. This is particularly problematic when framed around event latency counting within hardware, where events can range from 10 pclks to 10 k pclks for the same event type depending on the sequence of events incurred around the operation.

Typically, implementations in the hardware performance analysis arena rely on either cycle accurate counters or histogram counters to retain critical performance information. Cycle accurate counters are more accurate but must be oversized for their application to prevent overruns and come at a higher cost in terms of area, power consumption, and limitations in the number of unique events being monitored. Histogram counters are less accurate and trade off granularity to increase the range of events that can be covered for the same power and area costs that a cycle accurate counter would typically incur. This, in turn, frees up chip space and power, enabling additional unique events to be monitored by the counters.

Turning now to an overview of the aspects of the invention, one or more embodiments of the invention address the above-described shortcomings of the prior art by providing a method for having accuracy sensitive performance counters which provide the value of cycle accurate counters for short events and the granularity of histogram counters for long events. The accuracy sensitive performance counter enables the counter to express the total range of events in fewer bits than a cycle accurate counter would require while maintaining a high degree of accuracy across the range, overcoming limitations present in cycle accurate or histogram counter implementations. Aspects of the present invention include a pre-counter implemented as a register of a certain bit size; for example, a 16-bit register. The pre-counter counts a number of clock cycles that occur from the start of a hardware operation to the completion of the hardware operation. The number of clock cycles is stored in the pre-counter in binary format. (e.g., 01010101010) The pre-counter (register) is separated into three regions of the same or of a different number of bits. For example, for a 16-bit pre-counter, the first region (i.e., the binary bit locations having the largest values) can be 5 bits. So for positions in the binary number for 2^15, 2^14, 2^13, 2^12, and 2^11 would be stored in this first region. The second and third region can have the same size or in the case of the 16-bit register, an example would be region two has 6 bits and region three has 5 bits.

In one or more embodiments, the hardware counters are scaled, in some embodiments automatically, in granularity between a cycle accurate counter and a histogram recording counter. The counters are scaled automatically based on the value of the event to be recorded. The hardware expresses the value of a pre-counter in one of several modes depending on the value observed in the pre-counter. A cycle accurate representation is presented for a short latency event and histogram representation is presented for a long latency event. A single bit is used to indicate the change in representation while switching between the modes. More than one bit is used depending on the number of desired histogram granularity ranges. An example of a short latency event is a fetch operation from a near cache. An example of a long latency event is a fetch operation from a hard disk.

Figure 2:
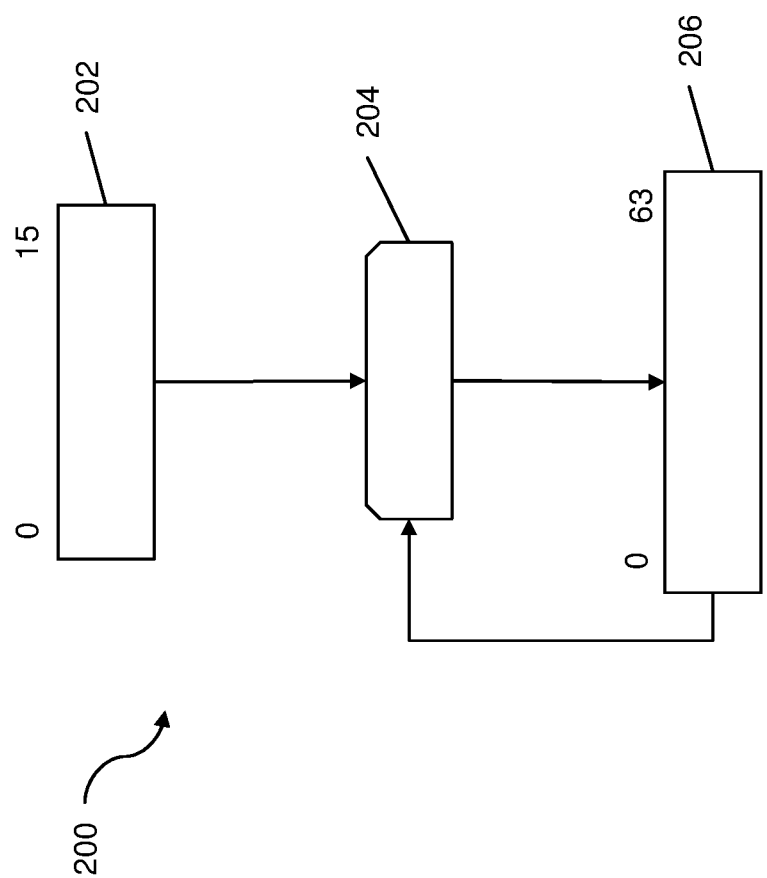
FIG. 2 depicts a hardware counter.

FIG. 2 depicts a hardware counter. The hardware counter 200 includes a pre-counter circuit 202, an adder circuit 204, and an accumulator circuit 206. In the illustrated example, the hardware counter 200 adds, via the adder circuit 204, a 16-bit pre-counter circuit to a 64-bit accumulator 206 to track service times and/or log-out times. The pre-counter 202 and the accumulator 206 are register circuits. The pre-counter 202 and the accumulator 206 are both oversized to account for a worst-case scenario. For example, a worst-case scenario could be a cache miss resulting in an overflow of the pre-counter 202. An overflow would be perceived as a max value of the pre-counter 202 and would result in a loss of accuracy to the pre-counter 202. For example, the pre-counter 202 is a 16-bit register than can support 0 to 65,535 clock cycles. Any value above that range is considered an overflow. The overflow can range from 1 clock cycle to several hundred or thousand clock cycles. A hardware event that takes over 100,000 clock cycles would be reported as the maximum number 65,535 and would result in a loss of accuracy. Additionally, an interface to return data must match the size of the accumulator circuit 206 (i.e., 64 bits) resulting in an expensive limitation in terms of space and power.

Figure 3:
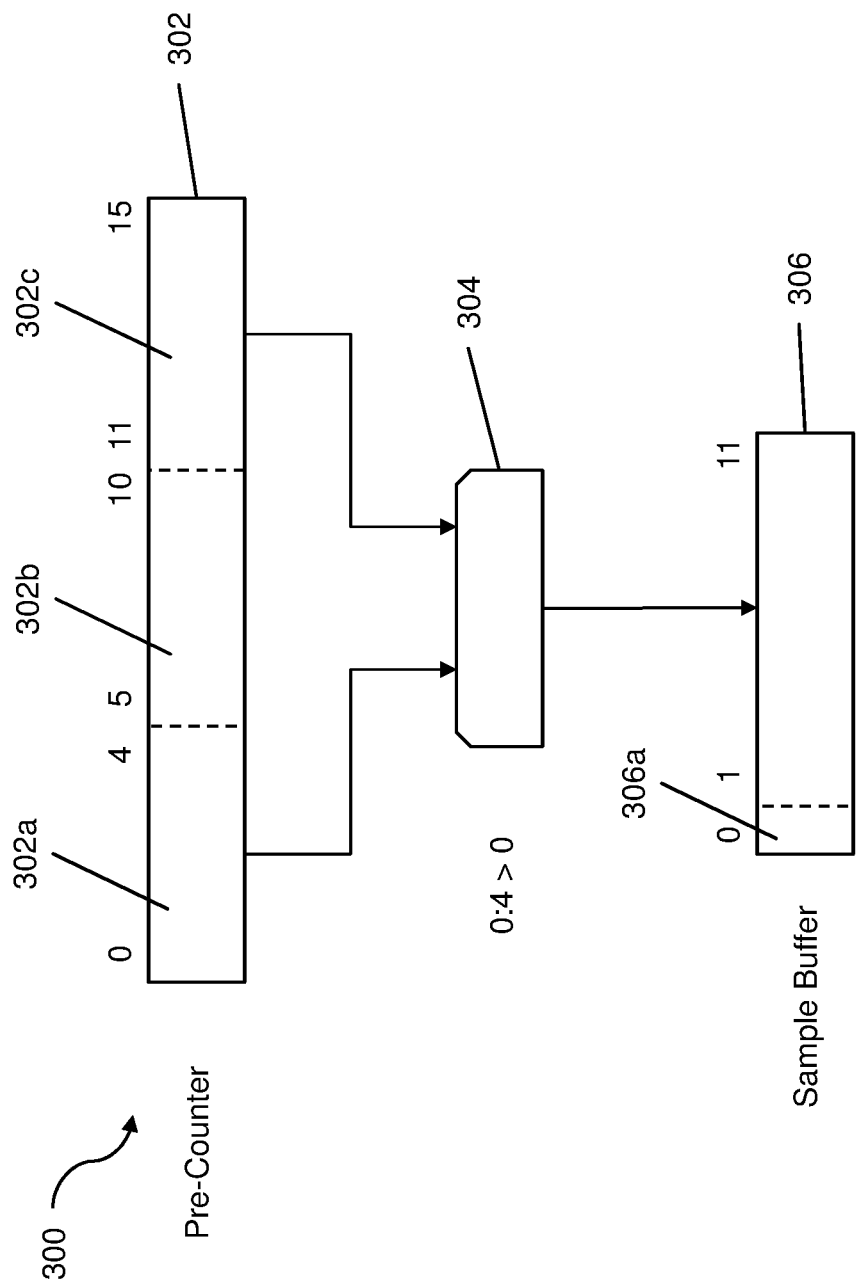
FIG. 3 depicts a block diagram of an accuracy sensitive performance counter according to one or more embodiments of the present invention.

FIG. 3 depicts a block diagram of an accuracy sensitive performance counter according to one or more embodiments of the present invention. The accuracy sensitive performance counter 300 includes a pre-counter circuit (hereinafter referred to as a "pre-counter") 302, an adder circuit 304, and a sample buffer 306. In the illustrative example, the pre-counter circuit 302 is a 16-bit register circuit. The pre-counter circuit 302 counts the number of clock cycles that occur from the beginning to the completion of a hardware related event. Hardware related events include, but are not limited to, cycles, typical start and stop events, instruction fetches and instruction completions, load fetches and load completions and cache misses and cache reloads. For example, a fetch operation commences for a processor and the pre-counter circuit 302 increments one value per clock cycle until the completion of the fetch event. The pre-counter 302 is separated into a first region 302a, a second region 302b, and a third region 302c. Each region has an associated bit location. For example, the first region 302a corresponds to the set of bit locations for bits 0-4 of the entire 16-bit binary number stored in the pre-counter 302. The second region 302b corresponds to the set of bit locations for bits 5-10 and the third region 302c corresponds to the set of bit locations for bits 11-15. For example, a hardware operation could take 44,206 clock cycles. The decimal number 44,206 can be represented as 1010110010101110. For this binary number stored in the pre-counter 302, the first region 302a (bits 0-4) would include 10101, the second region 302b (bits 5-10) would include 100101, and the third region 302c (bits 11-15) would include 01110.

In one or more embodiments, the sample buffer 306 includes a bit location for a granularity flag 306a. The sample buffer 306 stores at least a portion of the binary number stored in the pre-counter 302 based at least in part on the number of clock cycles it takes for a hardware operation to complete. The granularity flag 306a indicates which part of the number of clock cycles is stored in the sample buffer 306. In one or more embodiments, based on a determination that the first region 302a (i.e, bits 0-4) does not include a one, the sample buffer 306 stores the values in the second region 302b and the third region 302c (i.e., bits 5-15) and the granularity flag 306a is set to zero. Based at least on a determination that the first region 302a includes a one, the sample buffer 306 stores the values in the first region 302a and the second region 302b (i.e., bits 0-10) and the granularity flag 306a is set to one. In one or more embodiments, when the granularity flag is set to zero the counter can be referred to as "cycle accurate" and when the granularity flag is set to one the counter can be referred to as "histogram."

While in the illustrative example, the pre-counter is a 16-bit register and the sample buffer 302 is a 12-bit region, in one or more embodiments any sized registers can be used in one or more embodiments of the present invention. Also, in the illustrative example, only three regions are defined in the pre-counter, in one or more embodiments any number of regions can be defined designating any number of bits. For example, for a 16-bit register, four regions can be defined with 4 bits in each region. Also, while the illustrative example shows a granularity flag of 1 bit, in one or more embodiments any number of bits as a granularity flag. For example, if four regions are defined in the pre-counter, the granularity flag can be two bits to identify which of the four regions are stored in the sample buffer.

In one or more embodiments of the present invention, the multiplexer (mux) circuit 304 is controlled by a logical OR of the bits in the first region 302a. Based at least in part on that determination, the mux 304 writes either the upper regions (302a & 302b) or lower regions (302b & 302c) of the pre-counter 302 into the sample buffer 306.

In one or more embodiments of the present invention, the sample buffer 306 is used in conjunction with hardware processor sampling techniques, where data from sample buffer 306 and numerous of other sample buffers are periodically collected into a hardware array by a hardware service station. Once the hardware collection array fills, it is subsequently written to reserved memory locations for off-load and post-processing on a separate device.

Figure 4:
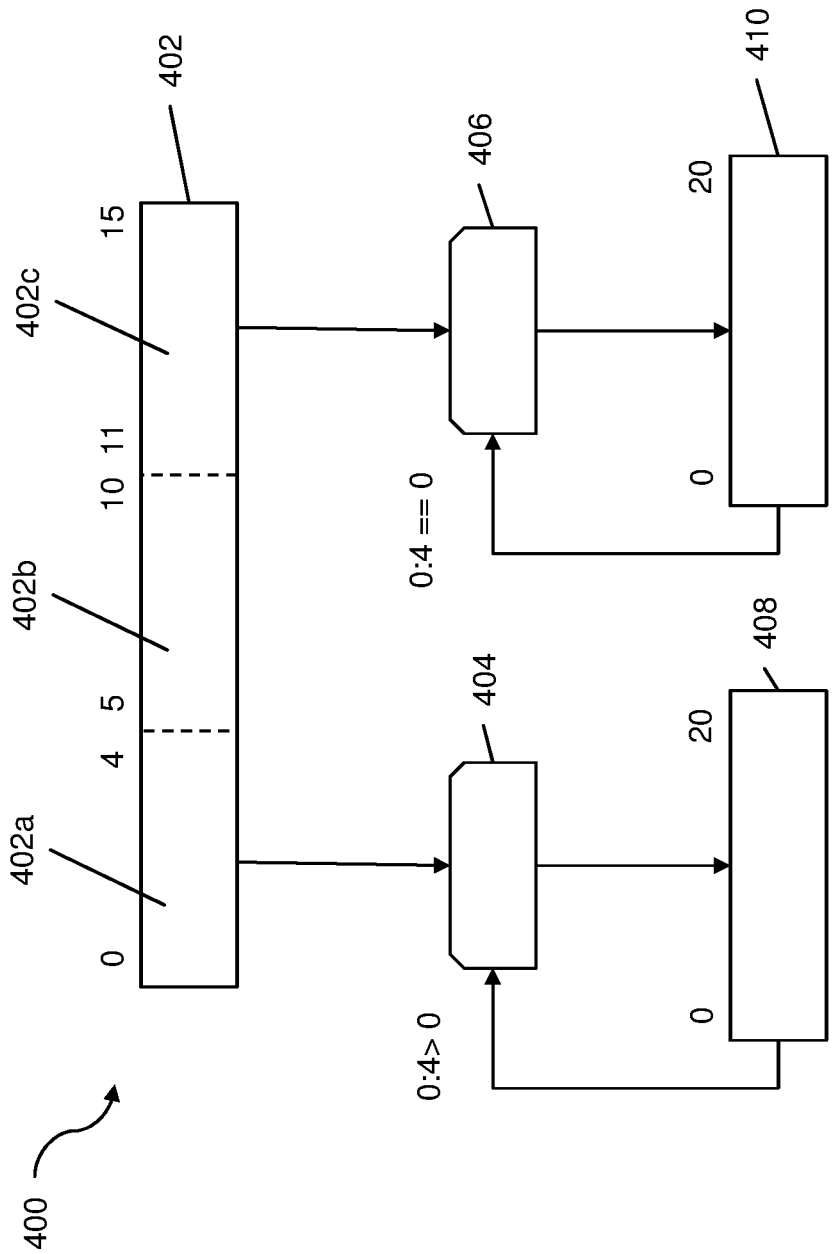
FIG. 4 depicts a block diagram of an alternate embodiment of an accuracy sensitive performance counter according to one or more embodiments of the present invention.

FIG. 4 depicts a block diagram of an alternate embodiment of an accuracy sensitive performance counter according to one or more embodiments of the present invention. The accuracy sensitive performance counter 400 includes a pre-counter circuit (hereinafter referred to as "pre-counter") 402, two adder circuits 404, 406, and a first accumulator 408 and a second accumulator 410. In the illustrated example, the pre-counter 402 is a 16-bit register and the two accumulators 408, 410 are each 21-bit registers. An accumulator circuit is a hardware element with sufficient bits to avoid overflow during an interval. The accumulator circuits can be implemented with one or more general purpose registers.

The pre-counter 402 counts the number of clock cycles that occur from the beginning to the completion of a hardware related event. Hardware related events include, but are not limited to, cycles, typical start and stop events, instruction fetches and instruction completions, load fetches and load completions and cache misses and cache reloads. For example, a fetch operation commences for a processor and the pre-counter circuit 402 increments one value per clock cycle until the completion of the fetch event. The pre-counter 402 is separated into a first region 402a, a second region 402b, and a third region 402c. Each region has an associated bit location. For example, the first region 402a corresponds to the set of bit locations for bits 0-4 of the entire 16-bit binary number stored in the pre-counter 402. The second region 402b corresponds to the set of bit locations for bits 5-10 and the third region 402c corresponds to the set of bit locations for bits 11-15.

In one or more embodiments of the present invention, the accuracy sensitive performance counter 400 includes a first accumulator 408 and a second accumulator 410. Each accumulator is a 21-bit register. Based at least in part on a determination that the first region 402a includes no values greater than zero, the values in the second region 402b and the third region 402c are stored in the second accumulator 410. Based at least in part on a determination that the first region 402a includes any values greater than zero, the values in the first region 402a and the second region 402b are stored in the first accumulator 408. In one or more embodiments, the first accumulator 408 can be referred to as a cycle accurate counter and the second accumulator 410 can be referred to as a histogram counter.

In one or more embodiments of the present invention, the first adder circuit 404 and the second adder circuit 406 determine if a one is located in the first region 402a by a logical OR of the bits in the first region. Based at least in part on that determination, the adders 404, 406 writes the regions of the pre-counter 402 into the respective accumulators.

Figure 5:
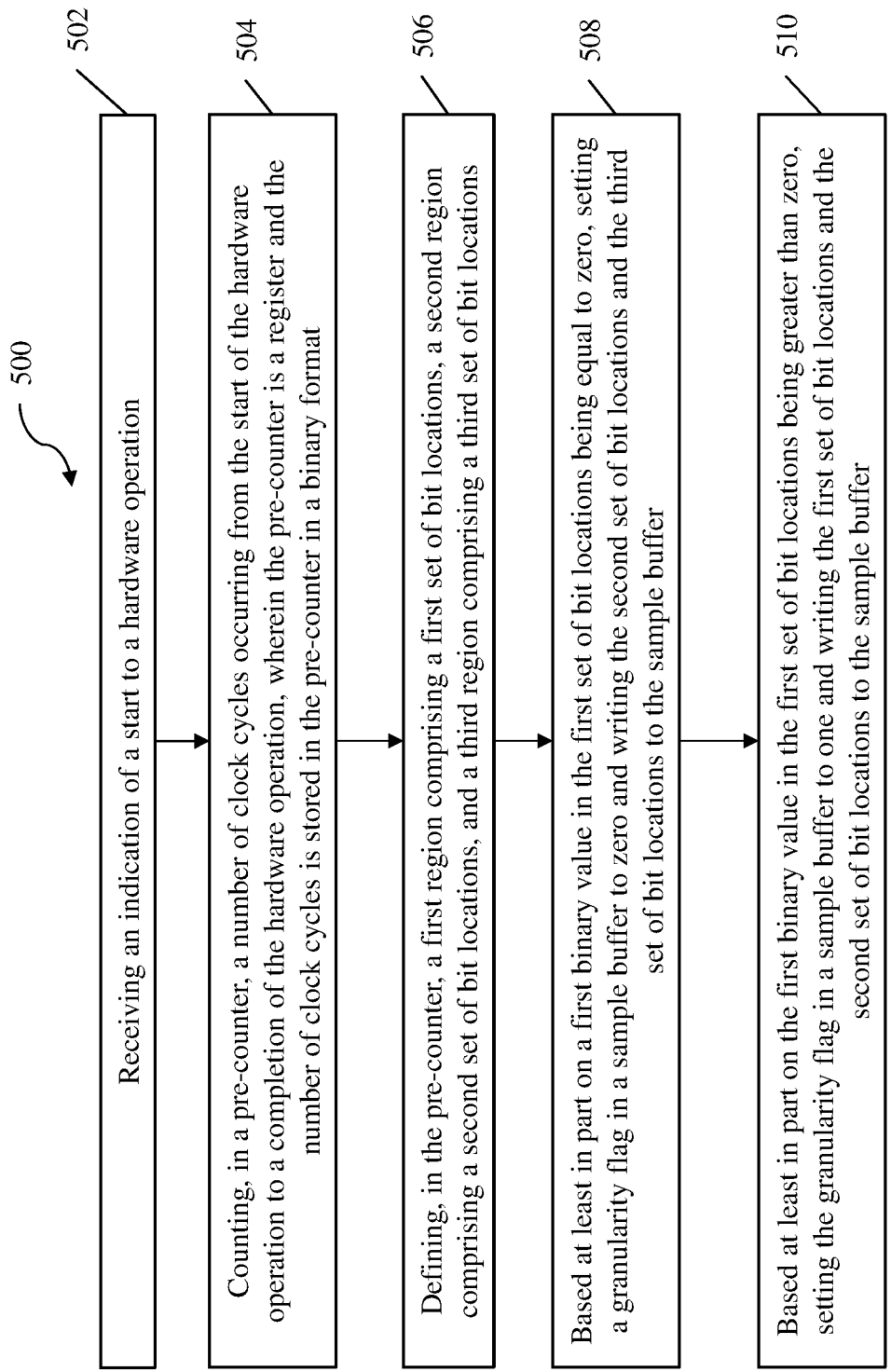
FIG. 5 depicts a block diagram of a method for measuring hardware performance according to one or more embodiments.

FIG. 5 illustrates a block diagram of a method for measuring hardware performance according to one or more embodiments. The method 500 includes receiving an indication of a start to a hardware operation, as shown at block 502. At block 504, the method 500 includes counting, in a pre-counter, a number of clock cycles occurring from the start of the hardware operation to a completion of the hardware operation, wherein the pre-counter is a register and the number of clock cycles is stored in the pre-counter in a binary format. The method 500, at block 506, includes defining, in the pre-counter, a first region comprising a first set of bit locations, a second region comprising a second set of bit locations, and a third region comprising a third set of bit locations. The method 500 includes based at least in part on a first binary value in the first set of bit locations being equal to zero, setting a granularity flag in a sample buffer to zero and writing the second set of bit locations and the third set of bit locations to the sample buffer, as shown at block 508. At block 510, the method 500 includes based at least in part on the first binary value in the first set of bit locations being greater than zero, setting the granularity flag in a sample buffer to one and writing the first set of bit locations and the second set of bit locations to the sample buffer.

Additional processes may also be included. It should be understood that the processes depicted in FIG. 5 represent illustrations, and that other processes may be added or existing processes may be removed, modified, or rearranged without departing from the scope and spirit of the present disclosure.

Technical benefits for the accuracy sensitive performance counters 300, 400 are accomplished by properly sizing the width of the final counter representation (e.g., sample buffers and accumulators) and the granularity of which values are being stored, the error margins on the histogram representation can be tuned accordingly relative to the degree of accuracy needed when the switch from cycle accurate to histogram occurs. Likewise, the relative frequency of the switch can be accounted for in determining the sizing based on expectations. By using this approach, the hardware can scale and overcome issues in covering wide ranges of cycle accurate information while remaining constrained to a lower number of total bits in the final implementation, thus saving area/power while maintaining relative accuracy needed for performance analysis.

In one or more embodiments of the present invention, the histogram representation does not lose much in terms of accuracy. In the illustrative example, with a 16-bit pre-counter retaining the first 11 bits, the error margin is around 1.49% which decreases as the register becomes larger or the defined regions are larger. For example, for a 21-bit precounter retaining the first 14 bits, the error margin is reduced to 0.8%.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for measuring hardware performance, the method comprising:

counting, in a pre-counter, a number of clock cycles occurring from a start of a hardware operation to a completion of the hardware operation;

defining, in the pre-counter, a first region comprising a first set of bit locations, a second region comprising a second set of bit locations, and a third region comprising a third set of bit locations;

based at least in part on a first binary value in the first set of bit locations being equal to zero, setting a granularity flag in a sample buffer to zero and writing the second set of bit locations and the third set of bit locations to the sample buffer; and based at least in part on the first binary value in the first set of bit locations being greater than zero, setting the granularity flag in a sample buffer to one and writing the first set of bit locations and the second set of bit locations to the sample buffer.

2. The method of claim 1 further comprising:
periodically sampling values from the sample buffer.

3. The method of claim 1, wherein the first region, the second region, and the third region are of equal size.

4. The method of claim 1, wherein the first region, the second region, and the third region are not of equal size.

5. The method of claim 1, wherein the second region is larger than the first region.

6. The method of claim 1, wherein the number of clock cycles is stored in a pre-counter, and
wherein the pre-counter is a 16-bit register.

7. The method of claim 6, wherein the sample buffer is a 12-bit register.

8. A computer-implemented method for measuring hardware performance, the method comprising:
counting, in a pre-counter, a number of clock cycles occurring from a start of a hardware operation to a completion of the hardware operation;

defining, in the pre-counter, a first region comprising a first set of bit locations, a second region comprising a second set of bit locations, and a third region comprising a third set of bit locations;

based at least in part on a first binary value in the first set of bit locations being equal to zero, writing the second set of bit locations and the third set of bit locations to a first accumulator; and based at least in part on the first binary value in the first set of bit locations being greater than zero, writing the first set of bit locations and the second set of bit locations to a second accumulator.

9. The method of claim 8, wherein the first region, the second region, and the third region are of equal size.

10. The method of claim 9, wherein the second region is larger than the first region.

11. The method of claim 8, wherein the first region, the second region, and the third region are not of equal size.

12. The method of claim 8, wherein the number of clock cycles is stored in a pre-counter, and
wherein the pre-counter is a 16-bit register.

13. The method of claim 8, wherein the first accumulator is a 21-bit register.

14. The method of claim 8, wherein the second accumulator is a 21-bit register.

15. A system for measuring hardware performance, the system comprising a processor, a pre-counter, a multiplexer, and a sample buffer, the processor configured to:
count, in the pre-counter, a number of clock cycles occurring from a start of a hardware operation to a completion of the hardware operation;

defining, in the pre-counter, a first region comprising a first set of bit locations, a second region comprising a second set of bit locations, and a third region comprising a third set of bit locations;

based at least in part on a first binary value in the first set of bit locations being equal to zero, setting a granularity flag in a sample buffer to zero and writing the second set of bit locations and the third set of bit locations to the sample buffer; and based at least in part on the first binary value in the first set of bit locations being greater than zero, setting the granularity flag in the sample buffer to one and writing the first set of bit locations and the second set of bit locations to the sample buffer.

16. The system of claim 15, wherein the processor is further configured to:
periodically sample values from the sample buffer.

17. The system of claim 15, wherein the first region, the second region, and the third region are of equal size.

18. The system of claim 15, wherein the first region, the second region, and the third region are not of equal size.

19. The system of claim 15, wherein the second region is larger than the first region.

20. The system of claim 15, wherein the number of clock cycles is stored in a pre-counter, and
wherein the pre-counter is a 16-bit register.

* * * * *